No. 830,665. PATENTED SEPT. 11, 1906.
J. T. JOHNS.
HORSESHOE.
APPLICATION FILED MAR. 29, 1906.
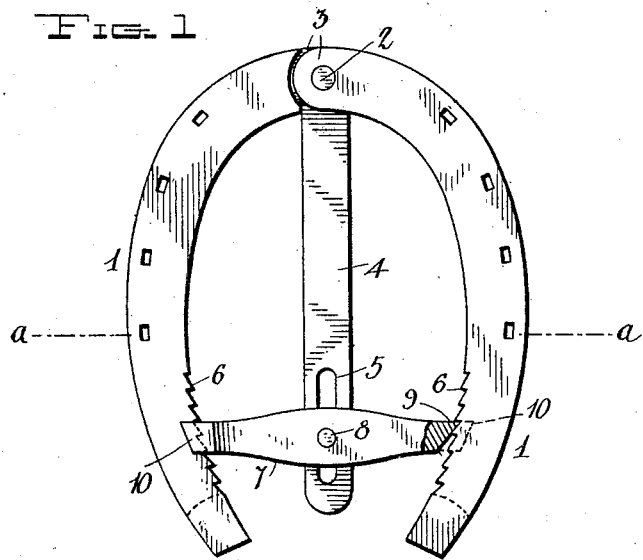
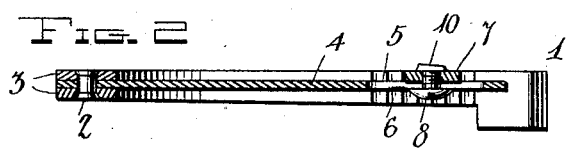
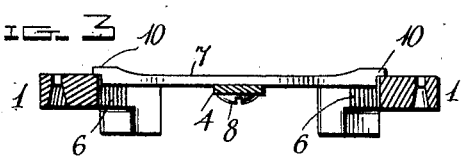
Witnesses
Inventor
J. T. Johns
by
Attorneys

UNITED STATES PATENT OFFICE.

JACK T. JOHNS, OF ARTESIA, TERRITORY OF NEW MEXICO.

HORSESHOE.

No. 830,665.     Specification of Letters Patent.     Patented Sept. 11, 1906.

Application filed March 29, 1906. Serial No. 308,755.

*To all whom it may concern:*

Be it known that I, JACK T. JOHNS, a citizen of the United States, residing at Artesia, in the county of Eddy and Territory of New Mexico, have invented certain new and useful Improvements in Horseshoes; and I do declare the following to be a full, clear, and exact description of the invention, such as will enable others skilled in the art to which it appertains to make and use the same.

My invention is an improved laterally-extensible horseshoe for expanding the hoof; and it consists in the construction, combination, and arrangement of devices hereinafter described and claimed.

In the accompanying drawings, Figure 1 is a top plan view of a horseshoe embodying my improvements. Fig. 2 is a longitudinal sectional view of the same; and Fig. 3 is a transverse sectional view of the same, taken on the plane indicated by the line $a\,a$ of Fig. 1.

The sides 1 of my improved horseshoe are pivoted together at the toe by a pivot 2. The said sides are provided at the toe with recessed overlapping portions 3, between which is inserted the front end of a longitudinal spring-bar 4, the same being also secured on the pivot 2 and being provided at its rear end with the longitudinal slot 5. On the inner sides of the side portions 1 of the shoe, near the rear ends thereof, are ratchet-teeth 6. A spreader-bar 7 is supported on the rear portion of the spring-bar 4, is adjustably connected to the said spring-bar by a screw 8, which operates in the slot 5, and the ends of the said spreader-bar are provided with points 9 to engage the ratchet-teeth of the side portions of the extensible shoe and shouldered extensions 10, which bear on the upper sides of the side portions of the shoe. It will be understood that the spreader-bar serves to determine the width of the space between the heels of the shoe and that by adjusting the same the shoe may be expanded laterally to any desired extent in order to expand the hoof. The frog presses on the spreader-bar, and this also promotes the expansion of the hoof.

By the use of my improved horseshoe a contracted hoof may be remedied. The sides of the shoe are secured to the hoof by the usual horseshoe-nails, and the pressure of the frog on the spreader-bar keeps the latter under all conditions in engagement with the ratchet-teeth of the sides of the shoe.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A horseshoe having its sides pivotally connected together at the toe and provided with ratchet-teeth in their opposing sides near the heel, in combination with a spreader-bar between the heel portions of the shoe engaged with the ratchet-teeth thereon and having shouldered end extensions bearing on the upper surface of the sides of the shoe, substantially as described.

2. A horseshoe having its sides connected together pivotally at the toe, an adjusting-arm extending longitudinally in the shoe between the sides thereof, and a spreader-arm adjustable on said adjusting-arm and engaging the sides of the shoe to vary the width of the space between the heels of the shoe, substantially as described.

In testimony whereof I have hereunto set my hand in presence of two subscribing witnesses.

JACK T. JOHNS.

Witnesses:
   GEORGE P. CLEVELAND,
   L. C. ROBERTSON.